July 2, 1940.                S. O. DODGE                2,206,559
                    HARNESS CORD END MEMBER FOR LOOMS
                          Filed Jan. 13, 1939
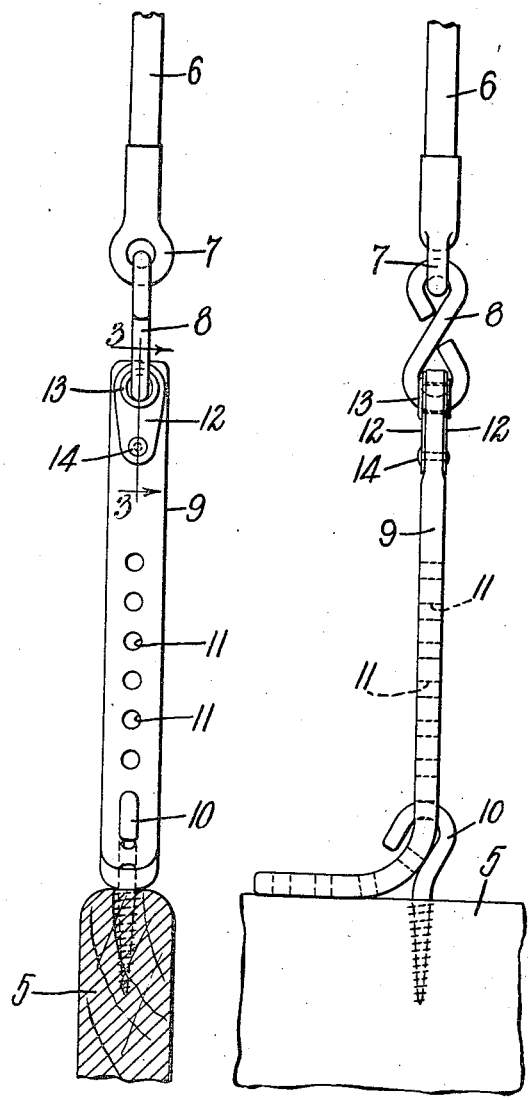
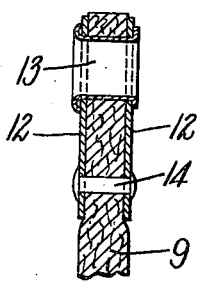
Fig.3.
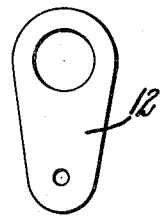
Fig.4.
Fig.1.    Fig.2.
Inventor:
Sherwood O. Dodge,
by Franklin E. Low
                Att'y.

Patented July 2, 1940

2,206,559

UNITED STATES PATENT OFFICE 2,206,559

HARNESS CORD END MEMBER FOR LOOMS

Sherwood O. Dodge, Medford, Mass., assignor to Guaranteed Parts, Inc., Allston, Mass., a corporation of Massachusetts Application January 13, 1939, Serial No. 250,706

3 Claims. (Cl. 24—141)

This invention relates to an improved harness cord end member for looms and commonly employed to form a flexible adjustable connection between the harness cord and the harness frame.

It has been common practice for many years to construct harness cord end members of leather, reinforcing the end portion thereof that is connected to the harness cord by inserting an eyelet in said end portion through which a link attached to the harness cord may be inserted. This method of reinforcing the end portion of the harness cord end member is unsatisfactory however, because the leather of which the end member is constructed is weakened where the eyelet is inserted therethrough and has a tendency to tear or break at the opposite sides of the eyelet.

The object, therefore, of this invention is to strengthen the end portion of a harness cord end member that is attached to a harness cord, and also distribute the strain caused by the operation of the harness frame over a greater portion of the area of the end member by providing a combined strain distributing and reinforcing structure consisting of an eyelet and a rivet, and a pair of clamping plates which also function as connecting members between said eyelet and rivet; said plates being clamped against the opposite faces of the harness cord end member by the combined clamping action of the eyelet and rivet, both of which are inserted through said plates and leather and headed or riveted in such a manner that the leather will be clamped between the plates, with the result that the strain will be transmitted to the end member by the eyelet and rivet jointly through the connecting plates and also distributed throughout the entire portion of the end member which is located between said plates.

The invention consists of a harness cord end member for looms as set forth in the following specification and particularly as pointed out in the claims.

Referring to the drawing:

Fig. 1 is a front elevation of a harness cord end member for looms embodying my invention, and including an end portion of a harness cord, and a link by means of which said cord is connected to the end member; together with a portion of a harness frame attached to the lower end portion of the end member.

Fig. 2 is a side elevation of the parts illustrated in Fig. 1 as viewed from the right thereof.

Fig. 3 is an enlarged detail section through the reinforced end portion of the harness cord end member as taken on the line 3—3 of Fig. 1.

Fig. 4 is an enlarged front elevation of a connecting member or clamping plate.

Like numerals refer to like parts throughout the several views of the drawing.

In the drawing, 5 represents a portion of an upper cross bar of a harness frame, 6 is an end portion of a harness cord, 7 a metal eye provided at the extremity of the cord 6, and 8 is a link by means of which the eye portion 7 of the cord 6 is attached to the upper portion of a flexible harness cord end member 9. The lower portion of the end member 9 is attached to the harness frame 5 by means of a hook 10 which is mounted in said frame and which may be inserted through any one of a plurality of holes 11 provided in the end member 9.

The harness frame 5, cord 6, eye 7, link 8 and hook 10 are old and well known in the art, and the novel features of this invention are all embodied in the structure of the harness cord end member 9 and are as follows: The end member 9 is preferably constructed of a strip of leather and is flexible in character. Positioned against opposite faces of the end member 9 adjacent to the upper portion of said faces are connecting members or plates 12 which are attached to said end member by means of a tubular fastening member as, for example, an eyelet 13 of well known form, and a rivet 14, the latter being of considerably less diameter than that of said eyelet, and both eyelet and rivet are headed or riveted against said plates 12 with sufficient pressure to compress the material of the end member tightly between the plates. The plates 12, furthermore, function as connecting members to connect the opposite end portions of the eyelet 13 with the opposite end portions of the rivet 14 in a manner to distribute the strain caused by the operation of the harness frame throughout the upper portion of the end member 9 that is located between the eyelet and rivet. The eyelet 13, rivet 14 and plurality of holes 11 are all preferably positioned upon the median line of the end member 9. The link 8 extends through the opening in the eyelet 13.

During the operation of the harness mechanism, as the frame 5 is alternately moved upwardly and downwardly, the strain upon the upper portion of the end member 9 will be distributed through said end member between the eyelet 13 and rivet 14 and throughout the end portion of said end member which is located between the plates 12, by reason of the connection between said eyelet and rivet through the plates 12, and because of the pressure applied by the plates upon the material of which the end member is formed, and any tendency of the material of the end member to tear or break at any point adjacent to the eyelet 13 is eliminated.

It is evident that in constructing the device of this invention any suitable form of tubular fastening member may be utilized as an eyelet to receive the link 8, and that the rivet 14 may be formed as a stud or pin; and that during the assembly of the structure the extremities of both eyelet and rivet may be headed or riveted as may be desired and in a manner well known to those skilled in the art.

It is furthermore evident that a very effective structure may be provided by heading or expanding the opposite extremities of the eyelet and rivet in such a manner that no actual clamping action is produced upon the connecting members to compress the flexible material of the end member 9 therebetween. Under such circumstances the strain upon the upper portion of the harness cord end member will be transferred from the eyelet to the rivet through the connecting members 12 and be distributed through that portion of the flexible material of the end member that is located between the eyelet and rivet.

It will be understood that the width of the harness cord end member is restricted for reasons well known to those skilled in the art. In the structure of this invention the diameter of the rivet 14 is considerably less than the diameter of the eyelet 13, and there will, therefore, be a much greater amount of flexible material around the rivet 14 than there is around the eyelet 13. The diameter of the rivet 14 is preferably less than the diameter of the holes 11 which receive the hook 10.

I claim:

1. A harness cord end member for looms having, in combination, a strip of flexible material, plates positioned against opposite faces of said strip of material adjacent to an end thereof, a tubular flanged eyelet inserted through said plates and flexible material adjacent to an end of the strip and plates, and a rivet of lesser diameter than that of the eyelet also inserted through the plates and material adjacent to the other end of each plate, said plates applying pressure from the flanges of said eyelet and from said rivet to clamp the strip of flexible material between the plates.

2. A harness cord end member for looms having, in combination, a strip of flexible material, metal plates positioned against opposite faces of said strip of material adjacent to the upper end thereof, a tubular flanged eyelet inserted through said plates and flexible material adjacent to the upper end of the plates, and a rivet of lesser diameter than that of the eyelet inserted through the plates adjacent to the lower end thereof and through the strip of material at an intermediate point therein.

3. In combination, a harness frame including a hook, an end member of flexible material having holes therein for attachment to said hook, rigid plates positioned against opposite faces of said end member adjacent to the upper end thereof, a tubular eyelet inserted through said plates and end member adjacent to the upper end of the plates, a rivet of lesser diameter than that of the eyelet inserted through the plates adjacent to the lower end thereof and through the end member at an intermediate point therein, a link attached to the end member at said eyelet, and a harness cord attached to said link.

SHERWOOD O. DODGE.